(12) United States Patent
Sloboda

(10) Patent No.: US 6,550,311 B2
(45) Date of Patent: Apr. 22, 2003

(54) METHOD OF ERROR DETECTION DURING EVALUATION OF SENSOR SIGNALS

(75) Inventor: Robert Sloboda, Yokohama (JP)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 09/847,829

(22) Filed: May 2, 2001

(65) Prior Publication Data

US 2001/0042398 A1 Nov. 22, 2001

(30) Foreign Application Priority Data

May 5, 2000 (DE) .......................... 100 21 913

(51) Int. Cl.⁷ ................................ F02P 5/14
(52) U.S. Cl. .................. 73/35.04; 123/406.16
(58) Field of Search ............... 123/406.14, 406.16, 123/479; 73/117.2, 117.3, 118.1, 35.03–35.06

(56) References Cited

U.S. PATENT DOCUMENTS

| | | | | |
|---|---|---|---|---|
| 4,264,972 A | * | 4/1981 | Drullmann et al. | 375/292 |
| 5,421,191 A | * | 6/1995 | Pyko et al. | 73/1.82 |
| 5,428,986 A | * | 7/1995 | Dietsche et al. | 73/35.04 |
| 5,517,969 A | | 5/1996 | Unland et al. | 123/425 |
| 6,317,681 B2 | * | 11/2001 | Elliott et al. | 123/406.16 |
| 2002/0116150 A1 | * | 8/2002 | Franke et al. | 702/185 |

FOREIGN PATENT DOCUMENTS

WO  PCT/DE 94/01041   9/1994

* cited by examiner

Primary Examiner—Daniel S. Larkin
Assistant Examiner—Rose M. Miller
(74) Attorney, Agent, or Firm—Michael J. Striker

(57) ABSTRACT

A method for error detection during an evaluation of sensor signals, in particular during an evaluation of output signals of knock sensors in an internal combustion engine, with at least one sensor and an evaluating device connected therewith, the method includes the steps of forming at least one variable reference level from output signals of a sensor or sensors; comparing the variable reference level for error detection with upper and/or limiting values; making a conclusion about an error in the case of a predeterminable exceeding of the upper and/or exceeding of the lower limiting value by the actual reference level; and forming at least one limiting value in dependence on preceding reference values.

8 Claims, 2 Drawing Sheets

METHOD OF ERROR DETECTION DURING EVALUATION OF SENSOR SIGNALS

BACKGROUND OF THE INVENTION

The present invention relates to a method for error detection during evaluation of sensor signals, and deals in particular with the evaluation of knock sensor signals in an internal combustion engine.

It is known that during the evaluation of sensor signals which is a basis for the regulation of a technical device, diagnostic measures must be taken which make possible detection of occurring faulty operation of the sensors. Such sensor diagnoses are known in particular in connection with the knock detection and knock regulation in the internal combustion engines. Knock sensors are associated with the cylinders of an internal combustion engine and provide a signal which allows to determine whether an undesirable knocking combustion occurs in at least one of the cylinders. Depending on the informations which are supplied by the knock sensors of the control device of the internal combustion engine, they influence the regulation variables, for example the emission time in the associated cylinders of the internal combustion engine. If a faulty operation of a knock sensor or an associated evaluating circuit is not recognized, there is a danger that the internal combustion engine is operated in an undesirable operational condition, which finally can lead to the situation that the internal combustion engine can be destroyed. Also, a falsly detected error can lead to undesirable operational conditions. For this reason nowadays in all devices for knock emission in internal combustion engine, monitoring measures are performed, which make possible detection of a faulty operation of a knock sensor or an associated evaluating device. A method or an associated arrangement for error detection during a knock detection it is disclosed for example in the patent document PCT/DE94/01041.

From this patent document it is well known that in a device for knock recognition for an internal combustion engine, the initial signals of the knock sensors after a certain preparation for error detection are compared with an upper and a lower rotary speed-dependent limiting value. If the actual standardized reference level formed from the actual sensor signal is located outside of the region formed by these both upper and lower rotary speed-dependent limiting values, an error is detected. A rotary speed-dependent upper limiting value UGO or the rotary speed-dependent lower limiting value UGU are determined so that they are located by a predeterminable fixed amount which represents a safety factor, above or below the possible maximum or minimum standardized reference level at the predetermined rotary speed. The determination of the upper limiting value UGO and the lower limiting value UGU from the maximum or minimum standardized reference level can be performed for example in accordance with plausibility considerations, wherein a once selected dependency of the standardized allowed reference level during the operation of the internal combustion engine is no longer changed. In one embodiment of the known solution, an error is recognized only when the actual standardized reference signal level leaves this region for a predeterminable time and then safety features are introduced which for example maintain an emission angle displacement. The safety features act until the standardized reference level is again located within the permitted region. Under a minimal rotary speed, no diagnosis is carried out.

SUMMARY OF THE INVENTION

Accordingly, it is an object of the present invention to provide a method for error detection during an evaluation of sensor signals, in particularly knock sensor signals in an internal combustion engine, in which at least one limiting value is formed in dependence on preceding reference values.

When the method is performed in accordance with the present invention, it has the advantage that a more secure error detection than in the prior art is possible, in which also manufacturing dispersion of the individual sensors as well as the sensitivity of the sensors reduces with time play no role. The safety distance of the rotary speed-dependent upper and lower limiting values from the allowed region of the standardized reference level can be reduced in an advantageous manner, whereby the reliability of the error detection is further increased.

These advantages are provided in that both the upper limiting value and the lower limiting value are designed as self-learning or adaptive-thresholds. These both limiting values or thresholds are rotary-speed dependent and increase with increasing rotary speed. They are dependent in an advantageous manner for preceding values of the standardized reference level and are changeable during the operation, for example of an internal combustion engine. An error detection is performed advantageously only when an actual standardized reference value of the upper limiting value is exceeded by a predetermined factor and/or the lower limiting value is exceeded by a predetermined factor, whereby the factors must not be identical.

In accordance with a further embodiment of the present invention it is advantageous that for the determination of the self-learning or adapted thresholds which form the upper and the lower limiting values of the permissible region, maximal and/or minimal values of the standardized reference level are utilized. These values are stored in suitable storage means of the evaluation device, for example of the control device of the internal combustion engine. This control device, in the case of the knock detection, in addition to the error detection also performs the knock detections and the subsequent knock regulations.

At low rotary speeds, in an advantageous manner a near stronger lower threshold is utilized for the activation of the error detection or diagnosis. Thereby it is guaranteed that in these conditions, no faulty error detection is performed. Also, the minimal rotary speed carried out during a diagnosis is maintained. However, in contrast to the prior art which is disclosed for example in the patent document PCT/DE 94/01041, it is displaced here to small rotary speeds.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
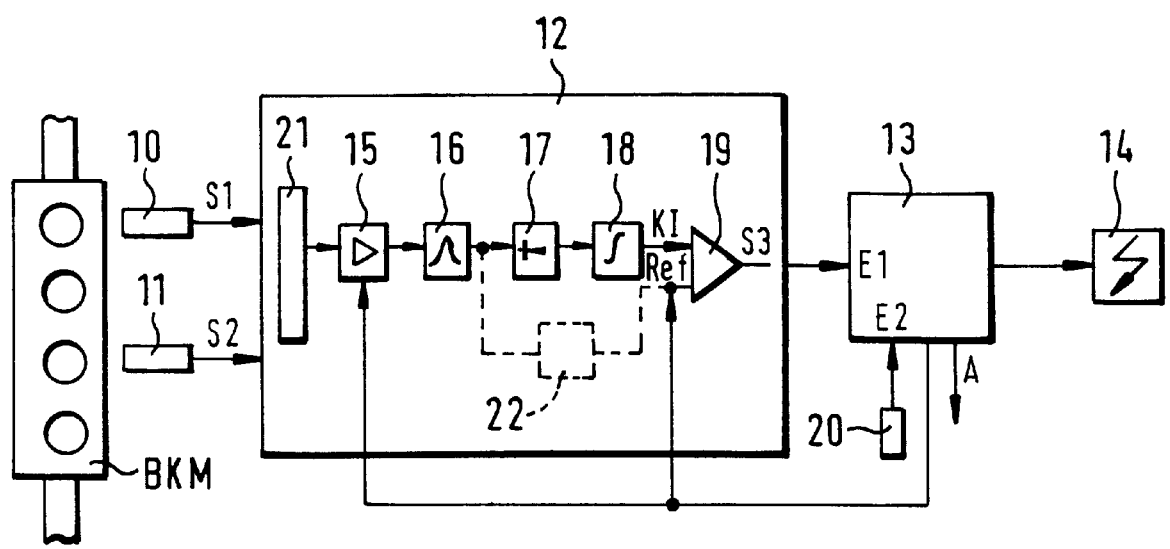
FIG. 1 is a view showing a device for knock detection of an internal combustion engine which is disclosed in PCT/DE94/01041 and is used in an embodiment of the present invention.

FIG. 1 shows a device for knock detection in an internal combustion engine described in the patent document PCT/DE94/01041. Such a device is suitable for performing the inventive method for error detection during the evaluation of sense signals, in particular knock sensor signals.

The device for knock detection shown in FIG. 1 includes two knock sensors 10 and 11 which are associated with schematically shown internal combustion engine BKM and they are arranged at predetermined points of the internal combustion engine. Instead of two knock sensors, one knock sensor or one knock sensor per cylinder etc can be available. The knock sensors 10 and 11 supply signals S1, S2 through an evaluating circuit 12 connected with an input E1 of a microcomputer 13 which is a component of a not shown control device. The microcomputer 13 can supply through a further input E2 additional signals which for example can characterize the operational condition of the internal combustion engine. Such a signal is for example the rotary speed N of the not shown crankshaft of the internal combustion engine, which is measured by a suitable sensor. The microcomputer 13 regulates, depending on the signals of the evaluating circuit 12 as well as the further signals, an ignition end stage 14 and/or further devices of the internal combustion engine, for example by an outputting of suitable signals at the output A.

The microcomputer 13 can be formed as a discrete circuit. It includes the required storage means which are required for the signal evaluation. The evaluating circuit 12 as well as the microcomputer 13 can also be assembled to form a signal control device, in particular the motor control device of the internal combustion engine.

The evaluating circuit 12 in the selected embodiment includes at least one amplifier 15 with an adjustable amplification factor. It supplies, through a multiplexer 21, alternatingly the output signals S1, S2 supplied from the knock sensors. In a subsequent band pass 16, the amplified signals are filtered so that the signal components with knock-typical frequencies are preferred. A demodulation circuit 17 is connected with the band pass 16 and formed for example as a rectifier, whose output signals are integrated in an integrator 18. The integrated signals or the adjustable content of the integrator are identified with K1. They are supplied to a first input of a comparitor 19 whose another input receives a reference level RF, which is obtained for example in a deep path 22 by averaging the knocking signals with greater time constants. The actual level of the reference signal is determined by means of the microcomputer 13 depending on the predeterminable operational conditions of the internal combustion engine. The construction of the device for knock detection is shown only schematically and described as much as it is necessary for the understanding of the invention disclosed in the present application.

For knock recognition the comparator 19 compares the integral value K1 with a suitable available reference value. Knocking is recognized when the value K1 exceeds the reference value in a predeterminable way. Then a signal S3 is outputted which indicates the knocking and is considered during the knock regulation of the microcomputer 13.

The special difficulties during the knock detection resides in that the signal supplied by the knock sensors includes not only the knock-typical components but also background signals, and both signal components are rotary speed-dependent. In order to provide a reliable knock detection, the formation of the reference value which is required for the knock recognition must be given special attention. The reference value has such a magnitude as to determine, how much signal component is derived from the background signals. A possibility for forming a specifically suitable reference level is described in the patent document PCT/DE 94/01041. For this purpose for example in accordance with the formula $$REF=(F1-1)/F1*REFA+1/F1**K1$$

is used. In this formula:

REF is a reference level,

REFA is a predetermined reference level,

K1 is a knock integral,

F1 is an adjustable factor, for example 16.

Starting from this reference level REF a further so-called standardized level REFN is formed. For this purpose for example the reference level REF is multiplied with a standardized factor V (i). The standardized reference level REFN (i) is then calculated for example as follows:

$$REFN(i)=(8/V(i))*REF(i)$$

in this formula:

REFN is a standardized reference level,

REF is a reference level,

V (i) is a standardizing factor for standardized reference signal.

The standardization is performed selectively by adjusting the amplification stage depending on the amplification factor. The standardizing factor has for example values of V (i)=1, 2, 4, 8, 16, 32, 64.

In addition to the knock detection, the device for knock detection shown in FIG. 1 or a similar device also performs a detection of an error operation of the knock sensors or an error in the evaluating circuit. For this purpose, starting from the reference value REF a variable is formed, which is suitable to perform a reliable error detection. This variable is at least one threshold value or limiting value, which in some cases is modified in a comparator, for example in a comparator 19, or is compared in the comparator which is not shown in the drawings with an actual reference value or an actual standardized reference value, so that a predeterminable deviation leads to an error detection.

If only one comparator for the knock detection and the error detection is utilized, the both detections can run with a time offset from one another. When the comparison is formed as a program step in the computer, two comparison operations are needed, including one for the knock detection and one for error detection.

Since the used knock sensors conventionally have a relatively high manufacturing dissipation and their sensitivity reduces with age, the knock regulation now operates with a relative knock detection. The reference level RES multiplied with a factor K for compensation of the sensitivity and aging changes. The knock sensor diagnosis disclosed in the patent document PCT/DE94/01041 operates however with absolute thresholds, which during the operation of the internal combustion engine are no longer changed, and therefore for compensation of eventually occurring changes of the sensitivity must be adapted to relatively high safety reserve.

In accordance with the present invention, an error detection is now described with upper and lower self-learning or adaptive rotary speed-dependent thresholds or limiting values, which form limits between allowable regions and regions in which an error can be detected. Thereby the safety interval relative to the known solution can be reduced and/or the diagnosis region can be expanded. Moreover, the safety interval is not influenced by aging, whereby the error detections of the diagnosis function are avoided. Error operations detected erroneously no longer occur. Since the inventive diagnosis operates in a self-learning manner, the application time is reduced and the application safety is increased. During the application, or in other words, during the determination of the upper and lower threshold, a low expenses are used, since the thresholds in the course of the operation are adapted optimally to the requirements.

In performing the inventive method, the two self-learning rotary speed-dependent characteristic lines UDKSNU and UDKSNO are utilized as upper and as lower thresholds or limiting values. These characteristic lines must have for example at least five supporting points. They are formed for example by a very slow filter, in particular in the background program, depending on the predetermined standardized reference levels. For this purpose minimal and maximal values of the standardized reference level REFN occurring in corresponding actual rotary speed region are stored in suitable storages of the evaluating device, for example in the computer of the control device. The rotary speed-dependent characteristic lines are formed from these minimal and maximal value. If an actual standardized reference level exceeds these self-learning thresholds by a rotary speed-dependent specific value, for example by a factor 0.5 or is under this value, the error is detected. For the upper and for the lower thresholds also different factors can be utilized, or also an error is detected when the actual reference level is located under an applicable fixed minimal threshold. As activating threshold for the diagnosis, a value NDKS is determined, which is displaced relative to the known solution to smaller rotary speeds. The thresholds are compared correspondingly in comparison means, for example in the comparators 19, 19a, which can be designed as program inquiries with actual values for the error detections.

Figure 2:
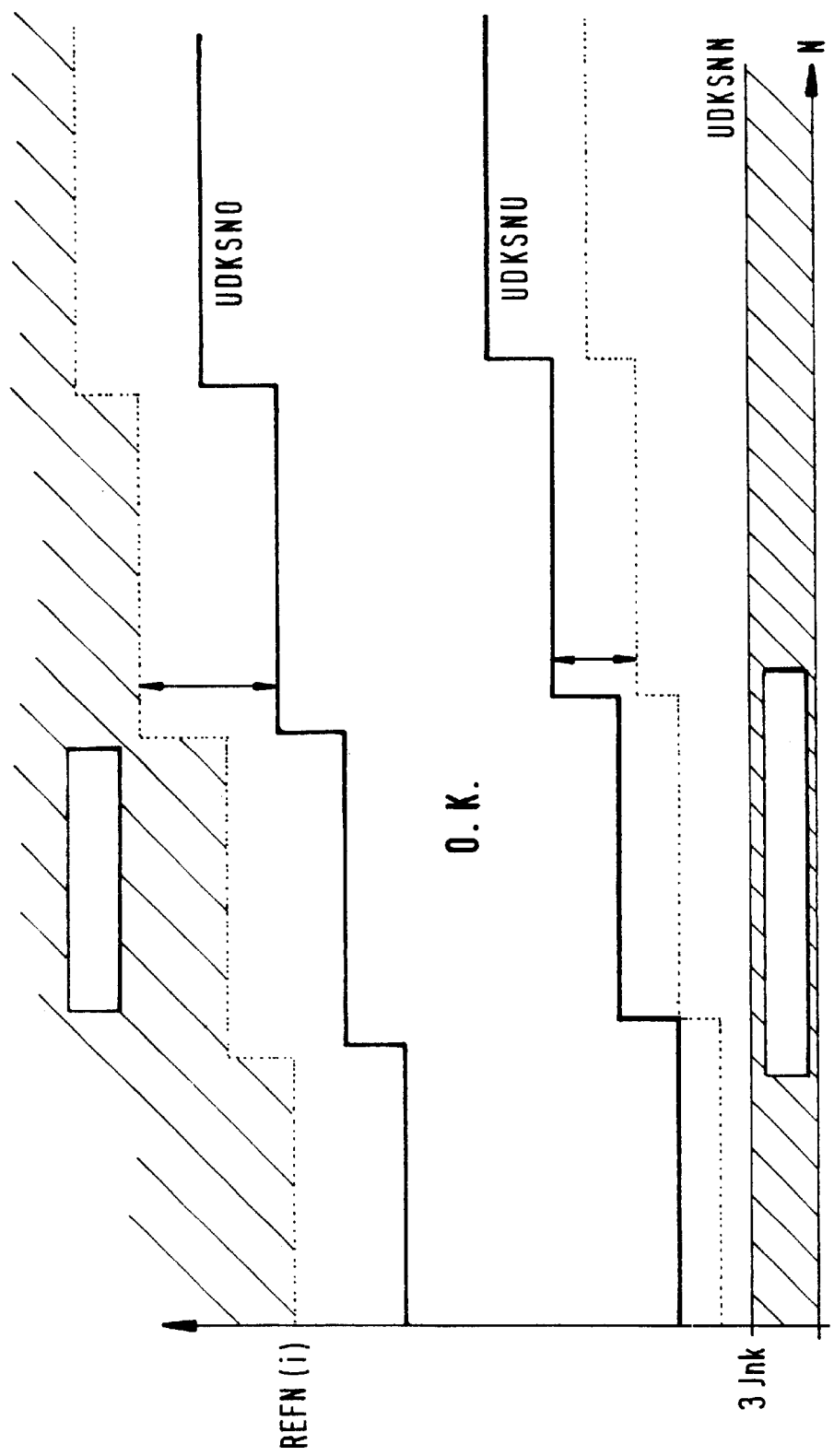
FIG. 2 shows a standardized reference level and corresponding maximum or minimum possible standardized reference levels with upper and lower limiting values plotted over the rotary speed, wherein the regions for standardized reference values which make a conclusion about an error are specifically identified.

FIG. 2 shows an example how the standardized reference level is changed in a rotary speed-dependent manner. Furthermore, it is detected in which regions also error can be recognized. The threshold UDKSNN identifies a minimum value from the standardized reference level. When an actual determines standardized reference level is located under this threshold, conventionally an error is not detected. However, for example in a further embodiment an error can be detected when this condition is present over a longer time period. The adapted lower and upper threshold values are identified as UDKSNU and UDKSNO. Between these both threshold values, a region is located which represents an always allowable region. If an actual standardized reference level is located in this region, it is always accepted as correct. Under the threshold UDKSNU, a further rotary speed determined threshold is located which is separated from UDKSNY by a safety factor. Above the threshold UDKSNO also a further threshold value which is spaced by a safety factor is located. If the actual standardized reference level is located above this threshold value or below the lower threshold value, always an error is detected.

After the initialization, or in other words after the start of the internal combustion engine, only the fixed minimal threshold UDKSNN is active. In other words in this case only an error is detected when an actual standardized reference level is located under this fixed minimal threshold of for example three increments. The learning of the both characteristic lines in the UDKSNU and UDKSNO is first released when the standardized reference level value is located over a value which corresponds to the value UDKSNN plus a further safety factor. Thereby it is prevented that after the initialization a withdrawn, or in other words not connected knock sensor is learned as correctly operating.

A new value is then stored, when the value over or under the last stored maximal or minimal value is located. Here the value is not considered as 100% but instead formed over an applicable factor. For example the adaptation of the lower and/or upper new threshold value UDKSNU/O (new) is determined in accordance with a similar formula, in accordance with which the reference level is determined. One possibility is:

$$UDKSNU/O(\text{new})=1/K\ (UDKSNU/O(\text{old})+(\text{MIN/MAX}-UDKSNU/O(\text{old}))).$$

The diagnosis over the adapted threshold must be released first when the learned values change only insignificantly and/or are located always over the minimal threshold UDKSNN.

The present invention is illustrated for a method for error detection in an arrangement for a knock detection. However, basically it can be used for other devices, for example evaluation of inductive sensor signals, which are compared with threshold values or reference values for forming of rectangular signals.

It will be understood that each of the elements described above, or two or more together, may also find a useful application in other types of methods differing from the types described above.

While the invention has been illustrated and described as embodied in method of error detection during evaluation of sensor signals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for error detection during an evaluation of output signals of knock sensor or sensors in an internal combustion engine, with at least one sensor and an evaluating device connected therewith, the method comprising the steps of forming at least one variable reference level from output signals of said sensor or sensors; comparing the variable reference level for error detection with upper and lower limiting values; making a conclusion about an error in the case of a predeterminable exceeding of the upper limiting value or falling below the lower limiting value by the actual reference level; and forming at least one of the upper and lower limiting value in dependence on preceding reference values.

2. A method as defined in claim 1; and further comprising using the factors depending on a rotary speed.

3. A method as defined in claim 1; and further comprising forming the upper and lower limiting value as self-learning characteristic lines UDKSNO and UDKSNU depending on preceding standardized reference values.

4. A method as defined in claim 3; and further comprising forming the both self-learning characteristic lines UDKSNO and UDKSNU rotary speed-dependent and by a slow filtering from standardized reference levels.

5. A method as defined in claim 3; and further comprising forming self-learning characteristic lines UDKSNU and UDKSNQ via reference level, and both.

6. A method as defined in claim 5; and further comprising forming the limiting values in accordance with the equation:

$$UDKNSU/O(\text{new})=1/K(UDKSNU/O(\text{old})+(\text{MIN/MAX}-UDKSNU/O(\text{old}))).$$

7. A method as defined in claim 1; and further comprising providing an error detection first above an average rotary speed and/or an average value for the standardized reference level.

8. A method as defined in claim 1; and further comprising a releasing an adaptation of the limiting value only when the learned value for the standardized reference level changes only significantly and/or is located above a minimal threshold.

* * * * *